(12) United States Patent
Seo

(10) Patent No.: US 11,538,342 B2
(45) Date of Patent: Dec. 27, 2022

(54) METHOD FOR PROVIDING PARKING SPACE GUIDE SERVICE

(71) Applicant: Min Soo Seo, Pyeongtaek-si (KR)

(72) Inventor: Min Soo Seo, Pyeongtaek-si (KR)

( * ) Notice: Subject to any disclaimer, the term of this patent is extended or adjusted under 35 U.S.C. 154(b) by 356 days.

(21) Appl. No.: 16/911,405

(22) Filed: Jun. 25, 2020

(65) Prior Publication Data

US 2021/0074159 A1   Mar. 11, 2021

(30) Foreign Application Priority Data

Sep. 5, 2019   (KR) .................. 10-2019-0110098

(51) Int. Cl.
```
G08G 1/14      (2006.01)
G06T 7/50      (2017.01)
G06T 7/70      (2017.01)
G01C 21/36     (2006.01)
G06T 11/00     (2006.01)
```
(Continued)

(52) U.S. Cl.
CPC ......... *G08G 1/143* (2013.01); *G01C 21/3691* (2013.01); *G06T 7/50* (2017.01); *G06T 7/70* (2017.01); *G06T 11/00* (2013.01); *G06T 19/006* (2013.01); *G06T 19/20* (2013.01); *G06V 20/56* (2022.01); *G06T 2200/24* (2013.01);
(Continued)

(58) Field of Classification Search
CPC .......... G08G 1/096866; G08G 1/0969; G08G 1/145; G08G 1/146; G08G 1/143; G08G 1/168; G01C 21/3685; G01C 21/3691; G01C 21/206; G06T 7/70; G06T 19/006; G06T 2200/24; G06T 2207/30252
See application file for complete search history.

(56) References Cited

U.S. PATENT DOCUMENTS 11,025,865 B1 *  6/2021  Medasani ............... H04N 7/181
11,113,841 B1 *  9/2021  Zelenskiy .............. H04N 5/247
(Continued)

FOREIGN PATENT DOCUMENTS

| KR | 10-2008-0053080 | 6/2008 |
| KR | 10-2016-0066115 | 6/2016 |
| KR | 10-2019-0048022 | 5/2019 |

OTHER PUBLICATIONS

English Specification of 10-2019-0048022.
English Specification of 10-2008-0053080.
English Specification of 10-2016-0066115.

*Primary Examiner* — Jin Cheng Wang
(74) *Attorney, Agent, or Firm* — Antonio Ha & U.S. Patent, LLC

(57) ABSTRACT

According to an embodiment, a method for providing a smart parking space guide service to provide a real-time moving route and occupancy state is executed by a parking space guide service provider server and comprises starting to trace a vehicle's moving route upon receiving the vehicle's entry event from an entry recognition device for recognizing entry of the vehicle into a parking lot, updating, in real-time, the vehicle's moving route upon real-time entry of the vehicle's moving route from at least one movement recognition device, displaying occupancy by the vehicle's parking on a pre-stored parking spot map upon sensing the vehicle's parking state from any one of at least one vehicle recognition sensor installed in at least one parking spot, and updating, in real-time, and displaying the vehicle's moving route and occupancy state on the pre-stored parking spot map.

7 Claims, 5 Drawing Sheets

(51) Int. Cl.
*G06T 19/00* (2011.01)
*G06T 19/20* (2011.01)
*G06V 20/56* (2022.01)

(52) U.S. Cl.
CPC .............. *G06T 2207/10028* (2013.01); *G06T 2207/30252* (2013.01); *G06T 2219/2016* (2013.01)

(56) References Cited

U.S. PATENT DOCUMENTS

| | | | | |
|---|---|---|---|---|
| 2012/0044019 | A1* | 2/2012 | Brostrom | H03F 3/217 330/75 |
| 2016/0379496 | A1* | 12/2016 | Cho | G08G 1/13 705/40 |
| 2018/0122245 | A1* | 5/2018 | Penilla | B62D 15/029 |
| 2018/0128638 | A1* | 5/2018 | Lei | G06Q 30/06 |
| 2018/0373249 | A1* | 12/2018 | Choi | G01C 21/3685 |
| 2019/0063947 | A1* | 2/2019 | Beaurepaire | G01C 21/3685 |
| 2019/0392543 | A1* | 12/2019 | Bautista | H04W 12/03 |
| 2020/0005641 | A1* | 1/2020 | Park | G08G 1/168 |
| 2020/0018602 | A1* | 1/2020 | Beaurepaire | G08G 1/146 |
| 2020/0226778 | A1* | 7/2020 | Zhang | G06T 7/74 |
| 2020/0307648 | A1* | 10/2020 | Noguchi | B60W 60/00253 |

\* cited by examiner

METHOD FOR PROVIDING PARKING SPACE GUIDE SERVICE

CROSS-REFERENCE TO RELATED APPLICATION(S)

This application is based on and claims priority under 35 U.S.C. 119 to Korean Patent Application No. 10-2019-0110098, filed on Sep. 5, 2019, in the Korean Intellectual Property Office, the disclosure of which is herein incorporated by reference in its entirety.

TECHNICAL FIELD

Embodiments of the disclosure relate to a method for providing a parking space guide service to provide a real-time moving route

DISCUSSION OF RELATED ART

With the number of vehicles drastically increasing, parking becomes trickier in, e.g., apartment buildings, department stores, marts, or other shopping malls, and a need exists for a system for efficiently securing a parking space and operating and managing parking facilities. To address the parking issues, most of department stores or marts employ parking staff to provide convenience to their customers. However, this way not only consumes lots of costs for employment but also fails to provide a fundamental solution. GPS, navigation, or mobile location-based services or techniques recently in wide use may work well for directing drivers to their desired destination but these technologies are difficult to apply for parking purposes.

Some techniques for grasping and letting drivers know available parking spaces have been disclosed in, e.g., Korean Patent Application Publication Nos. 10-2019-0048022 (published on May 9, 2019), 10-2008-0053080 (published on Jun. 12, 2008), and 10-2016-0066115 (published on Jun. 10, 2016).

However, the conventional techniques are incapable of real-time update, may cause a delay in image processing or analysis, or have difficulty in discovering in real-time idle parking spaces when the parking lot is congested with many vehicles. Further, when the vehicle is located in the underground parking lot, use of GPS may fail to provide accurate positioning, but may rather cause errors because no or erroneous GPS signals may be received.

SUMMARY

According to an embodiment, there may be provided a method for providing a smart parking space guide service to provide a real-time moving route and occupancy state, which may precisely and quickly grasp entry, movement, and parking position of a vehicle in real-time, notify the entering vehicle of the number of available parking spaces, and direct the vehicle to the available parking space in a precise manner. Thus, even when many vehicles simultaneously attempt to park in the parking lot, the vehicle parking state may be identified without delay and in real-time. Thus, the time taken to enter/exit or park may be minimized. The shortest route from the current position to the parking space may be provided to the driver. Thus, although the driver is unfamiliar with the parking lot, he is allowed to easily find a parking space. The capability of real-time gathering of vehicle information may relieve parking staff of their workloads. Further, unnecessary vehicle entry and exit may be avoided, thus preventing congestion. However, the objects of the embodiments are not limited thereto, and other objects may also be present.

According to an embodiment, a method for providing a smart parking space guide service to provide a real-time moving route and occupancy state is executed by a parking space guide service provider server and comprises starting to trace a vehicle's moving route upon receiving the vehicle's entry event from an entry recognition device for recognizing entry of the vehicle into a parking lot, updating, in real-time, the vehicle's moving route upon real-time entry of the vehicle's moving route from at least one movement recognition device, displaying occupancy by the vehicle's parking on a pre-stored parking spot map upon sensing the vehicle's parking state from any one of at least one vehicle recognition sensor installed in at least one parking spot, and updating, in real-time, and displaying the vehicle's moving route and occupancy state on the pre-stored parking spot map.

According to the embodiments of the disclosure, a method for providing a smart parking space guide service to provide a real-time moving route and occupancy state may precisely and quickly grasp entry, movement, and parking position of a vehicle in real-time, notify the entering vehicle of the number of available parking spaces, and direct the vehicle to the available parking space in a precise manner. Thus, even when many vehicles simultaneously attempt to park in the parking lot, the vehicle parking state may be identified without delay and in real-time. Thus, the time taken to enter/exit or park may be minimized. The shortest route from the current position to the parking space may be provided to the driver. Thus, although the driver is unfamiliar with the parking lot, he is allowed to easily find a parking space. The capability of real-time gathering of vehicle information may relieve parking staff of their workloads. Further, unnecessary vehicle entry and exit may be avoided, thus preventing congestion.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF EXEMPLARY EMBODIMENTS

Hereinafter, exemplary embodiments of the inventive concept will be described in detail with reference to the accompanying drawings. The inventive concept, however, may be modified in various different ways, and should not be construed as limited to the embodiments set forth herein. Like reference denotations may be used to refer to the same or similar elements throughout the specification and the drawings. However, the present invention may be implemented in other various forms and is not limited to the embodiments set forth herein. For clarity of the disclosure, irrelevant parts are removed from the drawings, and similar reference denotations are used to refer to similar elements throughout the specification.

In embodiments of the present invention, when an element is "connected" with another element, the element may be "directly connected" with the other element, or the element may be "electrically connected" with the other element via an intervening element. When an element "comprises" or "includes" another element, the element may further include, but rather than excluding, the other element, and the terms "comprise" and "include" should be appreciated as not excluding the possibility of presence or adding one or more features, numbers, steps, operations, elements, parts, or combinations thereof.

When the measurement of an element is modified by the term "about" or "substantially," if a production or material tolerance is provided for the element, the term "about" or "substantially" is used to indicate that the element has the same or a close value to the measurement and is used for a better understanding of the present invention or for preventing any unscrupulous infringement of the disclosure where the exact or absolute numbers are mentioned. As used herein, "step of" A or "step A-ing" does not necessarily mean that the step is one for A.

As used herein, the term "part" may mean a unit or device implemented in hardware, software, or a combination thereof. One unit may be implemented with two or more hardware devices or components, or two or more units may be implemented in a single hardware device or component.

As used herein, some of the operations or functions described to be performed by a terminal or device may be, instead of the terminal or device, performed by a server connected with the terminal or device. Likewise, some of the operations or functions described to be performed by a server may be performed by a terminal or device connected with the server, instead of the server.

As used herein, some of the operations or functions described to be mapped or matched with a terminal may be interpreted as mapping or matching the unique number of the terminal, which is identification information about the terminal, or personal identification information.

Hereinafter, embodiments of the disclosure are described in detail with reference to the accompanying drawings.

Figure 1:
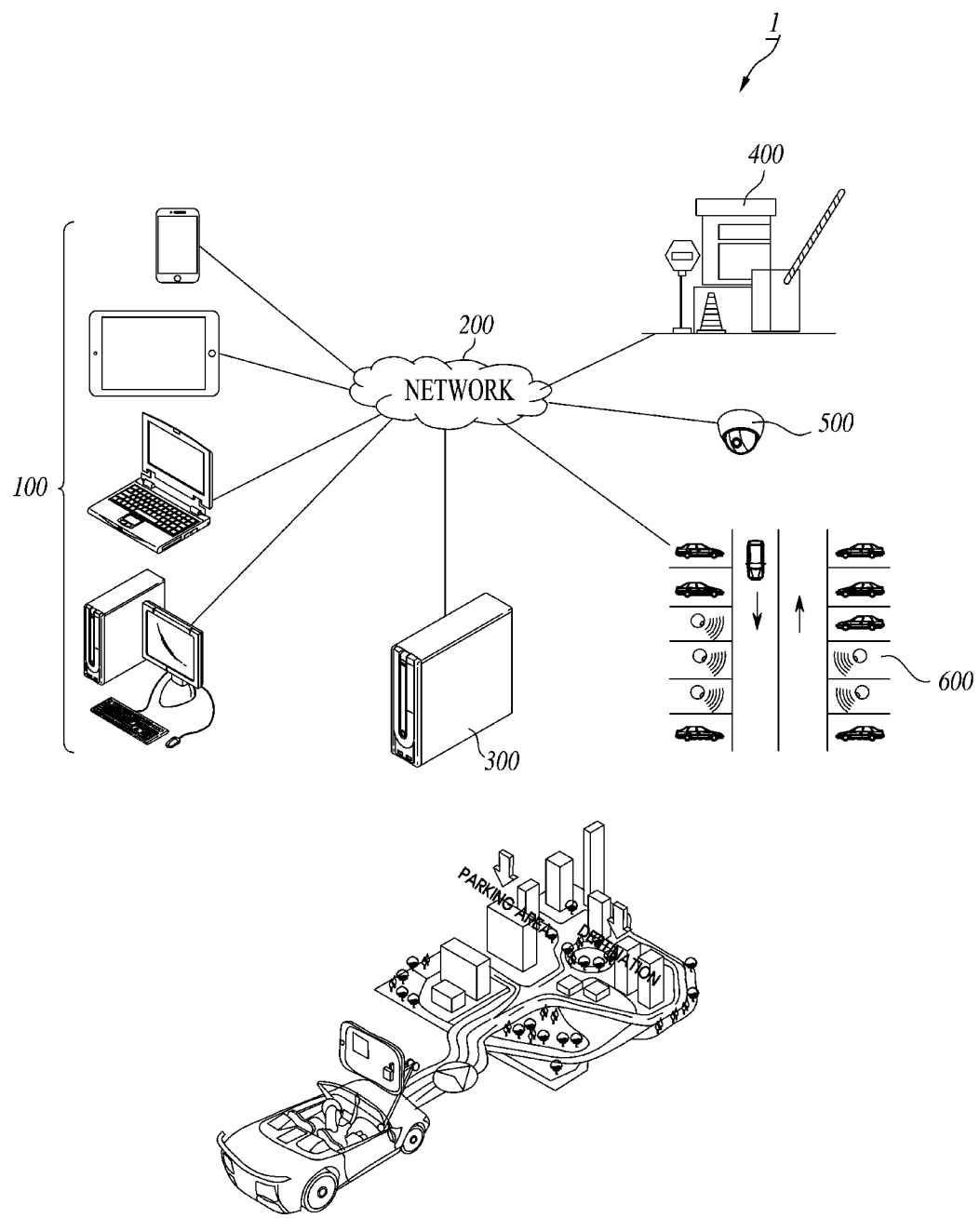
FIG. 1 is a view illustrating a smart parking space guide service provider system to provide a real-time moving route and occupancy state according to an embodiment of the disclosure.

FIG. 1 is a view illustrating a smart parking space guide service provider system to provide a real-time moving route and occupancy state according to an embodiment of the disclosure. Referring to FIG. 1, a smart parking space guide service provider system 1 to provide a real-time moving route and occupancy state may include at least one user terminal 100, a parking space guide service provider server 300, at least one entry recognition device 400, at least one movement recognition device 500, and a vehicle recognition sensor 600. However, the smart parking space guide service provider system 1 to provide a real-time moving route and occupancy state of FIG. 1 is merely an example and embodiments of the disclosure are not limited thereto.

The components of FIG. 1 are generally connected together via a network 200. For example, referring to FIG. 1, the at least one user terminal 100 may be connected with the parking space guide service provider server 300 via the network 200. The parking space guide service provider server 300 may be connected with the at least one user terminal 100, at least one entry recognition device 400, at least one movement recognition device 500, and vehicle recognition sensor 600 through the network 200. The at least one entry recognition device 400 may be connected with the parking space guide service provider server 300 via the network 200. The at least one movement recognition device 500 may be connected with the parking space guide service provider server 300 through the network 200. The vehicle recognition sensor 600 may be connected with the parking space guide service provider server 300 through the network 200.

Here, the term "network" means a connecting structure to enable exchanging of information between nodes, such as a plurality of terminals and servers. Examples of such network may include, but are not limited to, a radio frequency (RF) network, a 3rd Generation Partnership Project (3GPP) network, a Long Term Evolution (LTE) network, a Long Term Evolution-Advanced (LTE-A) network, a 5th Generation Partnership Project (5GPP) network, a World Interoperability for Microwave Access (WIMAX) network, an Internet network, a Local Area Network (LAN) network, a Wireless LAN network, a Wide Area Network (WAN) network, a Personal Area Network (PAN) network, a Bluetooth network, a satellite broadcast network, an analog broadcast network, and a Digital Multimedia Broadcasting (DMB) network.

As used herein, the singular forms "a," "an," and "the" are intended to include the plural forms as well, unless the context clearly indicates otherwise. According to embodiments, a plurality of components of the same type may be a single component of the type, and one component may add one or more components of the same type.

The at least one user terminal 100 may be a terminal that receives a guide to a parking space using a webpage, apppage, program, or application related to the smart parking space guide service to provide a real-time moving route and occupancy state, selects a parking space or outputs a route to the parking space, and when exiting from the parking lot, automatically pays for the parking fee. The at least one user terminal 100 may be a terminal that is connected with the parking space guide service provider server 300 via short-range or long-range communication. The at least one user terminal 100 may be a terminal that selects and reserves a parking space, performs a service provided from the parking space guide service provider server 300 in a background mode from the moment that the UE 100 accesses or is connected or linked to the parking space guide service provider server 300 and outputs the result of performing the service on the screen. The at least one user terminal 100 may communicate with the at least one vehicle recognition sensor 600 for distinguishing between the parking spots in the parking lot or identifying the parking spots and, when the location of the user terminal 100 is not identified via the global positioning system (GPS), the user terminal 100 may notify the parking space guide service provider server 300 of its location by transmitting an identifier output from the at least one vehicle recognition sensor 600 to the parking space guide service provider server 300.

The at least one user terminal 100 may be implemented as a computer capable of accessing a remote server or terminal via the network. Here, the computer may be, e.g., a navigation or web browser-equipped laptop computer or desktop computer. The at least one user terminal 100 may be implemented as a terminal capable of accessing a remote server or terminal via the network. The at least one user terminal 100 may be, e.g., a portable mobile wireless communication device examples of which may include navigation devices, a Personal Communication System (PCS), Global System for Mobile communications (GSM), Personal Digital Cellular (PDC), Personal Handyphone System (PHS), Personal Digital Assistant (PDA), International Mobile Telecommunication (IMT)-2000, Code Division Multiple Access (CDMA)-2000, W-Code Division Multiple Access (W-CDMA), Wireless Broadband Internet (WiBro) terminal, a smartphone, a smartpad, tablet PC, or any other various types of handheld wireless communication devices.

The parking space guide service provider server 300 may be a server that provides a webpage, apppage, program or application for the smart parking space guide service to provide a real-time moving route and occupancy state. The parking space guide service provider server 300 may be a server that may wiredly or wirelessly interwork or interact with the at least one entry recognition device 400, movement recognition device 500, and vehicle recognition sensor 600 and provides a state-of-the-art parking management platform that may pre-process and analyze the information received from the at least one entry recognition device 400, movement recognition device 500, and vehicle recognition sensor 600 to thereby identify entry of a vehicle, grasp the moving route of the vehicle, and guide the vehicle, grasp and guide to the parking space, and pay for the parking fee. To that end, the parking space guide service provider server 300 may identify and analyze entry of a vehicle received from the at least one entry recognition device 400 and, if there is entry of a vehicle, traces the moving route of the vehicle via the at least one movement recognition device 500 and, if the vehicle parks in a parking space, switch the parking space from unoccupied to occupied and update the parking space map in real-time. Further, the parking space guide service provider server 300 may predict the occupancy of the parking space by the vehicle considering the vehicle's moving route and direction and speed of moving backward or forward, display an available parking space to the vehicle entering the parking lot, or real-time monitoring the context of occupancy via the user terminal 100 and display, in real-time, an available parking spot on the map on the screen of the vehicle entering the parking lot or the user terminal 100.

The parking space guide service provider server 300 may be implemented as a computer capable of accessing a remote server or terminal via the network. Here, the computer may be, e.g., a navigation or web browser-equipped laptop computer or desktop computer.

The at least one entry recognition device 400 may be a vehicle recognition device that uses a webpage, apppage, program or application related to the smart parking space guide service to provide a real-time moving route and occupancy state. The entry recognition device 400 may be a sensor or camera capable of recognizing only entry of the vehicle or a device capable of identifying the vehicle by recognizing even the plate number of the vehicle. Or, the entry recognition device 400 may be a device capable of identifying the vehicle and whether the vehicle enters by sensing the wireless frequency output from the vehicle but is not limited thereto. For example, the entry recognition device 400 may be any device capable of identifying whether the vehicle enters.

The at least one entry recognition device 400 may be implemented as a computer capable of accessing a remote server or terminal via the network. Here, the computer may be, e.g., a navigation or web browser-equipped laptop computer or desktop computer. The at least one entry recognition device 400 may be implemented as a terminal capable of accessing a remote server or terminal via the network. The at least one entry recognition device 400 may be, e.g., a portable mobile wireless communication device examples of which may include navigation devices, a Personal Communication System (PCS), Global System for Mobile communications (GSM), Personal Digital Cellular (PDC), Personal Handyphone System (PHS), Personal Digital Assistant (PDA), International Mobile Telecommunication (IMT)-2000, Code Division Multiple Access (CDMA)-2000, W-Code Division Multiple Access (W-CDMA), Wireless Broadband Internet (WiBro) terminal, a smartphone, a smartpad, tablet PC, or any other various types of handheld wireless communication devices.

The at least one movement recognition device 500 may be a device that traces the moving route of the vehicle using a webpage, apppage, program or application related to the smart parking space guide service to provide a real-time moving route and occupancy state. The at least one movement recognition device 500 may be at least one closed-circuit television (CCTV) device (e.g., a surveillance camera) or vehicle detecting sensor or may be a passive or active radio frequency identification (RFID) that is formed in a mesh type and includes an identifier to indicate the location and allows the location of the vehicle recognizing the tag to be identified with the identifier, or the movement recognition device 500 may be a device capable of tracing the GPS of the user terminal 100, but not limited thereto.

The vehicle recognition sensor 600 may be a sensor for identifying whether a vehicle parks or whether there is a vehicle using a webpage, apppage, program or application related to the smart parking space guide service to provide a real-time moving route and occupancy state. The vehicle recognition sensor 600 may be a piezoelectric sensor coil installed on the floor or may be a CCTV device, ultrasonic sensor or distance sensor for identifying the object of vehicle, but not limited thereto.

Figure 2:
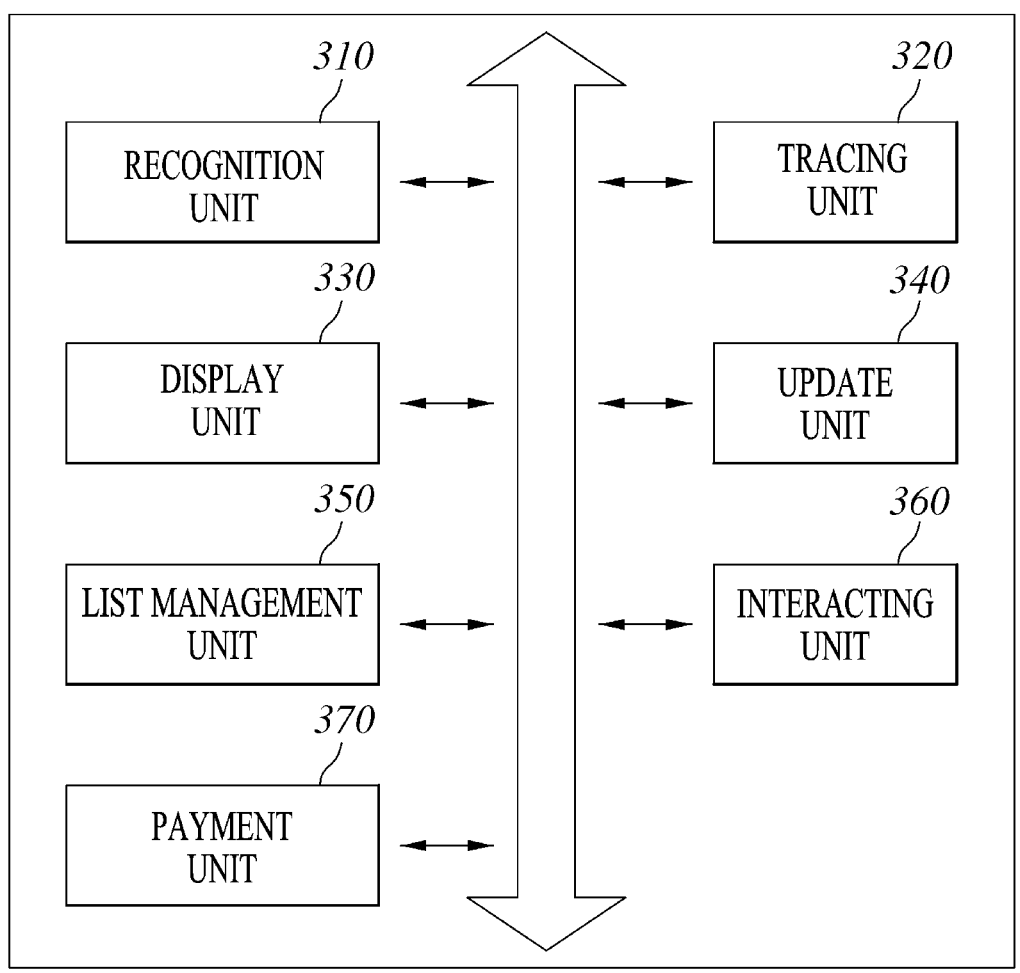
FIG. 2 is a block diagram illustrating a parking space guide service provider server included in the system of FIG. 1.
Figure 3:
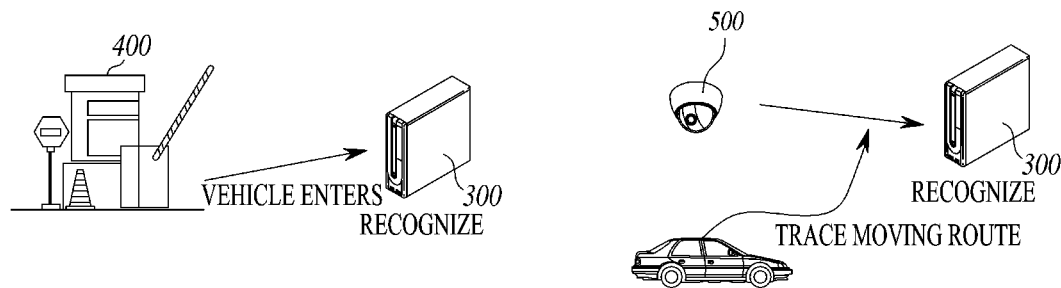
FIGS. 3 and 4 are views illustrating an example implementation of a smart parking space guide service to provide a real-time moving route and occupancy state according to an embodiment of the disclosure.
Figure 3:
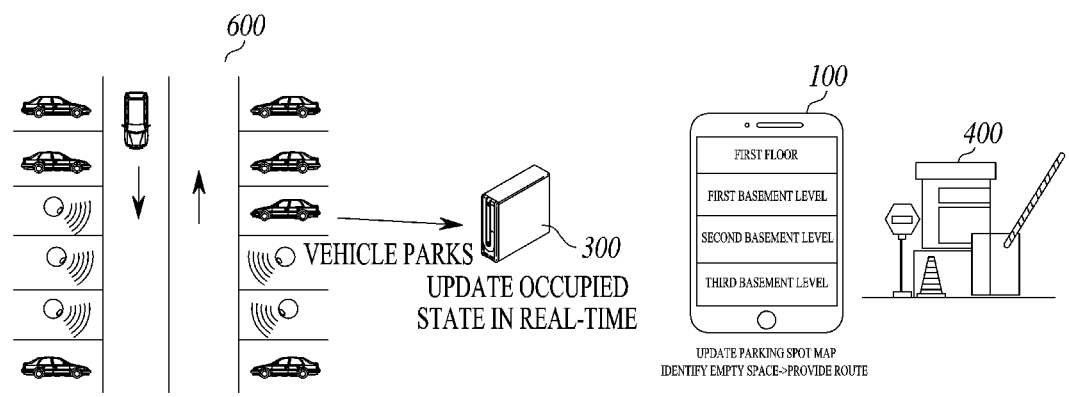

FIG. 2 is a block diagram illustrating a parking space guide service provider server included in the system of FIG. 1. FIG. 3 is a view illustrating an example implementation of a smart parking space guide service to provide a real-time moving route and occupancy state according to an embodiment of the disclosure.

Referring to FIG. 2, a parking space guide service provider server 300 may include a recognition unit 310, a tracing unit 320, a display unit 330, an update unit 340, a list management unit 350, an interacting unit 360, and a payment unit 370.

According to an embodiment, when the parking space guide service provider server 300 or other server (not shown) interworking with the parking space guide service provider server 300 transmits an application, program, apppage, or webpage for a smart parking space guide service to provide a real-time moving route and occupancy state to at least one user terminal 100 and at least one entry recognition device 400, the at least one user terminal 100 and the at least one entry recognition device 400 may install or open the application, program, apppage, or webpage for the smart parking space guide service to provide a real-time moving route and occupancy state. Further, a service program may be driven on the at least one user terminal 100 and the at least one entry recognition device 400 using a script executed on a web browser. Here, the web browser may be a program or application that enables use of world wide web (WWW) services or that receives and shows hypertext written in the hypertext mark-up language (HTML), and the web browser may include, e.g., Netscape, Explorer, or Chrome. The term "application" may mean an application executed on the terminal, and the application may include, e.g., an app running on a mobile terminal, e.g., a smartphone.

Referring to FIG. 2, upon receiving a vehicle's entry event from the entry recognition device 400 for recognizing entry of a vehicle into the inside of the parking lot, the recognition unit 310 may start to trace the moving route of the vehicle. The vehicle's entry may be recognized by the entry recognition device 400 via the plate number of the vehicle which enters the parking lot or via a coil installed on the floor, or the location of the user terminal 100 of the user who is the driver of the vehicle may be recognized by the parking space guide service provider server 300 and be transferred to the entry recognition device 400.

When the vehicle's moving route is input in real-time from at least one movement recognition device 500, the tracing unit 320 may update the vehicle's moving route in real-time. If the parking lot is above the ground, GPS recognition is possible, but positioning may be inaccurate. This issue may worsen when the parking lot is an underground parking lot and, reception of GPS signals may be impossible at the third or fourth basement level. Thus, it is required to trace the vehicle's moving route by cooperation between GPS and RFID lattice or beacon or CCTV device which is capable of positioning, rather than by GPS alone. Tracing one object, i.e., vehicle, via CCTV would not need high computation loads. However, tracing multiple objects, vehicles, which enter and move in various directions, may cause a delay and make real-time update impossible. Thus, an increased accuracy and reduced platform computation loads may be achieved by recognizing vehicles via beacons, RFIDs, or sensors, tracing them via CCTV, and interworking with the user terminal 100.

If the movement recognition device 500 includes a CCTV device, the tracing unit 320 needs to grasp where the entering vehicle is moving to via multi-object recognition and which parking spot the vehicle which has entered the parking space is moving to. To recognize multiple objects in the image from the CCTV device, the detected image is normalized by resizing, recoloring into black and white, binarizing, and correcting the brightness of, the input image as pre-processing tasks, a background is generated with respect to the parking lot bottom with no vehicle thereon, the stored background and the input image are compared to thereby detect a movement, and to optimize vehicle verification and vehicle detection through the plate number area in the moving object, gamma adjustment is performed on the input image, and edge detection in the image may be performed. A vehicle detection area may be set, and any vehicle in the set area may be detected. The detected position may be grasped, and the number of vehicles that may be parked may be calculated. Then, an ID is assigned per area via per-area parking surface settings, and parking surface information gathering and guide according to the ID may be rendered possible. Where the parking lot is of a single level, the parking lot layer and map may be generated in two dimension (2D). However, if the parking lot is a multi-level parking lot, a map needs to be created in such a manner as to be layered in 3D. In other words, if the amplitude is varied although the coordinates remain the same, the location of parking may be varied, and this issue is not addressed simply by GPS sensing. In this case, the moving route of the vehicle may be identified by installing at least one tag or beacon in each parking spot and allowing the user terminal 100 to recognize the identifier of the tag and returning the value to the tracing unit 320.

Upon sensing the parking state of the vehicle from any one of at least one vehicle recognition sensor 600 installed in at least one parking spot, the display unit 330 may display the occupancy by the vehicle's parking on a pre-stored parking spot map. The at least one vehicle recognition sensor 600 may be an ultrasonic sensor for outdoor use or be a CCTV device for indoor use. When ultrasonic sensors are used, the display unit 330 read the values sensed by the ultrasonic sensors and sets the currently used digits as the number of the ultrasonic sensors having recognized an object within a predetermined distance. The digits are then compared with the digits previously calculated and in use and, if not identical, i.e., if no variation has been made to the digits in use, the digits in use and the captured photo together may be updated. In this case, the number of parking spaces not in use may be calculated from the image read through the CCTV device using an image analysis openCV library. By so doing, the name and address (ID) of the parking lot selected by the user may come out and the use time of parking and the number of parking surfaces available may be displayed. However, embodiments of the disclosure are not limited thereto, but other various methods may rather be used.

For guiding to a parking space in an outdoor parking lot, the display unit 330 may use CCTV, but because of a narrow view angle of CCTV, the whole space may not be covered and, thus, some areas may not be captured by the camera. Thus, according to an embodiment of the disclosure, there may be used a method of recognizing the parking space using a wide angle camera and boosting algorithm. When a wide angle camera capable of capturing in a wide range is used to save the camera installation costs, image distortion may occur in which case the vehicle may also be deformed, and use of a general image processing scheme may deteriorate the performance. Thus, separate distortion correction may further be performed to reduce distortion due to the wide field-of-view (FOV) camera. To that end, the display unit 330 may minimize image distortion without any separate distortion correction step by warping the image to the parking space normalized as if it is viewed from the front under the assumption that the coordinates of the parking spot is previously known. Warping, i.e., image warping, for deforming the input image refers to the process of defining the coordinates of four vertexes of the parking slot in the image and obtaining the coordinates of the normalized parking slot to be transformed. In this case, all the pixels inside the four vertexes of the parking slot in the image may be transformed into the coordinates of the normalized parking slot using an H matrix, and a normalized parking slot image may be obtained by performing computation on all the pixels inside the four vertexes of the parking slot. Use of image warping enables obtaining a constant parking spot image even from the distorted image using a wide FOV camera, enhancing the recognition capability.

Next, the haar-adaboost algorithm may be applied to determine whether there is a vehicle from the results obtained using image warping. In this case, the display unit 330 determines whether there is a vehicle from the input image, using a boosting algorithm adopting haar-like features. Haar-like feature refers to the feature of a rectangular shape basically consisting of 0's and 1's. The haar-like feature is a method of comparing the respective area brightness sums of the patches and extracts the features of positive/negative image sets while searching the inside of the image. As a result of the boosting algorithm, several haar-like features with high weights may be obtained. The high-weight haar-like features may be selected by the boosting algorithm using the fact that, for the vehicle, the difference in brightness between the upper and lower portion of the number late and bonnet is clear and, for empty parking spots, a brightness difference is made with respect to the parking block, and whether there is a vehicle may be finally determined. The method of determining and displaying whether a vehicle is parked is not limited thereto, but other various methods may rather be used.

The update unit 340 may update, in real-time, and display the moving route and occupancy state of the vehicle on the pre-stored parking spot map. In this case, the vehicle's moving route and occupancy state may be displayed on a light emitting diode (LED) or liquid crystal display (LCD) panel in the parking lot or may be broadcast to the user terminal 100. Once it is recognized that the user terminal 100 is located in the parking lot, although the user terminal 100 does not open the app or access the webpage, forced access to the background by the broadcasting may be gained, and thus, the occupancy state and map may automatically be displayed on the screen of the user terminal 100. Thus, such automated display may eliminate the need for the driver to manually control her smartphone to do so, thus preventing any traffic accident which may otherwise occur while increasing user convenience and availability.

In the case where the vehicle's moving route is input in real-time from at least one movement recognition device 500, when the update unit 340 updates the vehicle's moving route in real-time, the update unit 340 may perform 3D image processing to extract depth information for the object corresponding to the vehicle in the image or image data received from at least one movement recognition device 500 and identify the moving direction. If the CCTV device lacks depth information, the moving direction is grasped based on an increase or decrease in size, i.e., depending on whether the vehicle approaches or gets away from the camera, in which case it may be not properly determined whether the vehicle's movement is for just passing or parking. Thus, the vehicle's moving route may be more precisely grasped by 3D image processing, and the map may be layered in 3D layers to be able to grasp the vehicle's moving direction and occupancy state in the parking lot for which the vehicle's direction and flow matter.

Further, an A* algorithm may be used to provide the shortest distance to a predetermined parking spot. A biggest reason for congestion in the parking lot may be when the driver is hesitant to determine what spots he drives to or when an accident occurs. Thus, providing a moving route to the driver's desired parking slot may prevent such congestion or accident. A* which is a shortest route discovery algorithm is a method for figuring out the shortest route between the start node and destination node clearly designated, unlike Dijkstra's algorithm which designates only the start node and discovers the shortest route for all other nodes. The A* algorithm may be enhanced via heuristic values. How fast the shortest route may be grasped is determined depending on what way the heuristic values are provided in. The heuristic value is the ranking value for estimating the optimal route passing through the vertexes, and the computation loads may be reduced by designating the corner point closest to a designated position inside the parking lot as the heuristic node. The method of providing the shortest route is not limited thereto, but other various methods may rather be used.

When receiving the vehicle's exit event from the exit recognition device for recognizing the vehicle's exit from the parking lot after the display unit 330 displays the occupancy by the vehicle's parking on the pre-stored parking spot map upon sensing the vehicle's parking state from any one of at least one vehicle recognition sensor 600 installed in at least one parking spot, the list management unit 350 may remove the vehicle from the parking vehicle list.

When entry of the at least one user terminal 100 is directed to the inside of the parking lot after the update unit 340 updates, in real-time, and displays the vehicle's moving route and occupancy state on the pre-stored parking spot map, the interacting unit 360 may overlay the updated moving route and occupancy state on the parking spot map and transmit the parking spot map to the at least one user terminal 100. The interacting unit 360 may control the at least one user terminal 100 to output the moving route and occupancy state on the screen. In this case, instead of the user terminal 100, a head-up display (HUD) may be used to output the moving route and occupancy state, thereby preventing the user's inconvenience of controlling the smartphone to open the app while driving.

The vehicle HUD is a kind of display that may display the vehicle's condition, warnings, alerts, or notifications, thereby allowing the user to remain at proper speed and assisting in arriving at the destination on time via visual or audible notifications. Since driving is a task that requires simultaneous processing of various types of visual/audible stimuli, it is critical to provide information without distracting the driver. In particular, since the user's attention may be influenced by the time of providing information to the user and interfacing schemes, it may be preferable in light of layout that the parking spot map information may be displayed at an upper portion than a lower portion to allow the lower portion necessary for driving to be viewed. Further, visibility may be increased by increase the difference in chroma between the information colors indicating the direction turning, and arrows, blocks, or other symbol icons may be shown around the parking space and moving route information to allow the driver to grasp the direction and distance information even with slight caution while driving. The time of displaying may be a critical factor. Given that the time of providing information may be brought forward in the left/right turn decision context which requires high caution as compared with other contexts, in reserving, selecting, or route directing to an empty parking space, the guide may be provided earlier than the preset time, for left turns, right turns, other than moving straight, and moving to the next floor.

After controlling the at least one user terminal 100 to output the moving route and occupancy state on the screen, and when the at least one user terminal 100 selects an unoccupied parking space on the parking spot map, the interacting unit 360 may switch the selected parking space to the occupied state and route-direct to the parking space selected by the at least one user terminal 100. Except for when the vehicle's entry is intermittent, tailgating of many vehicles to enter the parking lot is frequent in department stores or marts. In such a case, if two vehicles try to park in the same parking space, a quarrel may occur. The interacting unit 360 may display a map for available parking spaces to the HUD or user terminal 100. When a parking space is selected via the user terminal 100 or HUD, this may be marked as occupied, and the moving route to the parking space may be provided. Thus, the hassle of reservation or idle parking spots may be avoided by allowing the vehicle to select a parking space as soon as it enters the parking lot. Further, this way may prevent any dispute over the same parking space which may otherwise occur when the parking lot is congested with many vehicles.

After the update unit 340 updates, in real-time, and displays the moving route and occupancy state on the pre-stored parking spot map, the payment unit 370 may calculate the parking fee based on the time of entry to the parking lot and the time of exit from the parking lot of the at least one user terminal 100. The payment unit 370 may transmit an authorization request to the at least one user terminal 100 to automatically pay for the parking fee calculated by the at least one user terminal 100 and, when an authorization event is generated in response to the authorization request, automatically pay for the parking space. Conventionally, a worker stays at the entrance or exit of the parking lot and stops the entering or exiting vehicle by lowering the barricade to get the parking payment. This may delay entry or exit of vehicles to/from the parking lot. Upon recognizing entry and exit of the vehicle, the payment unit 370 allows for automatic calculation and payment even without the user's control on the user terminal 100. Although in the above-described configuration, the step of receiving the user's authorization is included, if the user previously transfers his authorization, payment may be immediately performed even without control on the user terminal 100. To that end, the user terminal 100 may be previously associated with a pre-stored payment means or authorization for payment may be carried out by a predetermined action.

The parking space guide service provider server 300 may provide a parking guide for autonomous vehicles. When an autonomous vehicle enters the parking lot or sets a route, the parking space guide service provider server 300 enables a selection as to whether to drive in autonomous driving mode or park in manual mode. For example, when an autonomous vehicle enters the parking lot in autonomous driving mode, the parking space guide service provider server 300 may receive the vehicle flow in the parking lot and parking space information from the parking lot and provide the driver with the parking place and location information via a voice or display, but without limitations thereto. Since the autonomous vehicle (AV) does not perform pairing with the beacon which is the key short-range communication scheme of Internet of things (IoT), the above-described service may be appropriate for the AV. Of course, this is not limited to the beacon. When a vehicle arrives at a specific parking space, the parking space guide service provider server 300 may transmit a beacon message to inquire whether to park and, upon receiving a response to the beacon message, the computer of the vehicle is executed to be used as light as possible by the user (or driver) of the parking lot. During this course, the parking space guide service provider server 300 needs to have a map file modeled and processed for the building, and the vehicle requires an algorithm that allows the vehicle to park precisely in an empty parking space at a clear distance on the map. This is rendered possible by the above-described configuration of directing the vehicle to an empty parking space via the parking space guide service.

For example, the parking space guide service provider server 300 needs to allow the autonomous vehicle to move along a predetermined optimal route from the start position to the final parking position. In this case, Dijkstra's algorithm in which none of the variables have negative weights may be used. The coordinates of the parking lot model are calculated, and the vertexes and edges of the graph may be connected. If the departure position and arrival position of the graph are given, the optimal route may be returned among the vertexes and edges connected by the algorithm. Further, since the parking space has been represented as a coordinate space in expressing the parking space diagram, the next rotation direction may be implemented using the cross product of the vector, but not limited thereto. A client processing scheme may use multi-threading that processes the request from the user terminal 100 which is the smartphone equipped in the vehicle and the request from the driver's application. Further, an application for increasing user convenience may be designed to allow the user to precisely know the location of the vehicle on the map. Thus, when the parking confirm button is pressed on the user terminal 100, the parking space guide service provider server 300 may fetch parking lot information, select an empty parking space closest to the entrance, among the parking spaces, and performs Dijkstra's algorithm taking the parking space as a target point and the start position as a start point. The user terminal 100 may gather the information generated after Dijkstra's algorithm is performed from the parking space guide service provider server 300 and may start autonomous parking using the angular acceleration and cross product. Since the connection between the vehicle and the parking space guide service provider server 300 is maintained even when the vehicle is in the parked state, if the user desires to exit and thus presses an exit button, the parking space guide service provider server 300 recalculates the route from the parked position to the exit to thereby generate a moving route and transmits the moving route to allow the vehicle to exit. Embodiments of the disclosure are not limited thereto, but other various methods may rather be used.

Operations of each component of the parking space guide service provider server of FIG. 2 are described below in detail with reference to FIG. 3. However, what is described below is merely an example, and embodiments of the disclosure are not limited thereto.

Referring to FIG. 3, the parking space guide service provider server 300 (*a*) recognizes entry of a vehicle via the entry recognition device 400, (b) recognizes the movement of the vehicle via the movement recognition device 500, and (c) grasp the vehicle's moving route and whether the vehicle parks, and if parked, where the vehicle has parked. Thus, if the next vehicle enters, the parking space guide service provider server 300 may (d) output the occupancy and empty parking spaces from the entrance or ramp and, when an empty parking space is selected, provide a moving route to the parking space.

Figure 4:
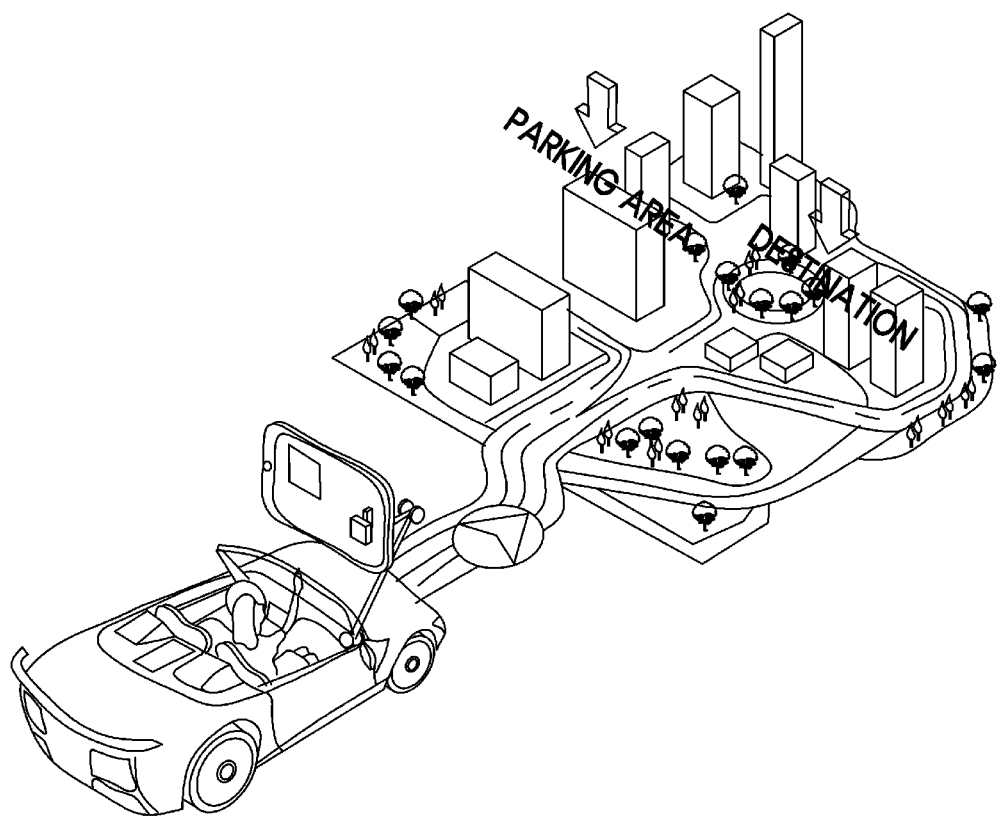

Referring to FIG. 4, an example is shown in which the moving route is provided via an HUD. Before entering the parking lot, route direction is performed up to the place where the parking lot is located and, if entry of the vehicle is recognized at the entrance of the parking lot, the space of the parking lot may be displayed in 3D layers to indicate what space has an empty parking space and how to go to the empty parking space. Generally, since the connection pathway or door for a mart or department store is most preferred, the route with the shortest distance from the connection pathway may also be provided to the user (or driver), thereby increasing user convenience. To see the map layered in 3D, the user may control the screen of the user terminal 100 or HUD with gestures or motion. There may be provided a user interface (UI)/user experience (UX) that enables control on the map via gestures or motion such as enlarging, rotating, shrinking, or moving, as to where an empty parking space is present and, if any, whether parking in the parking space is hard or not when the parking lot of the department store is located on the fifth to eighth floor. Thus, the pre-stored parking spot map is formed of a two-dimensional (2D) image when the parking lot is a single-level parking lot, and the pre-stored parking spot map is formed of a 3D image when the parking lot is a multi-level parking lot. The parking spot map may be rotated, enlarged, shrunken, moved, or selected by at least one touch gesture user interface (UI).

What is not described regarding the method of providing a smart parking space guide service to provide a real-time moving route and occupancy state in connection with FIGS. 2 to 4 is the same or easily inferred from what has been described regarding the method of providing a smart parking space guide service to provide a real-time moving route and occupancy state in connection with FIG. 1, and no detailed description thereof is thus presented.

Figure 5:
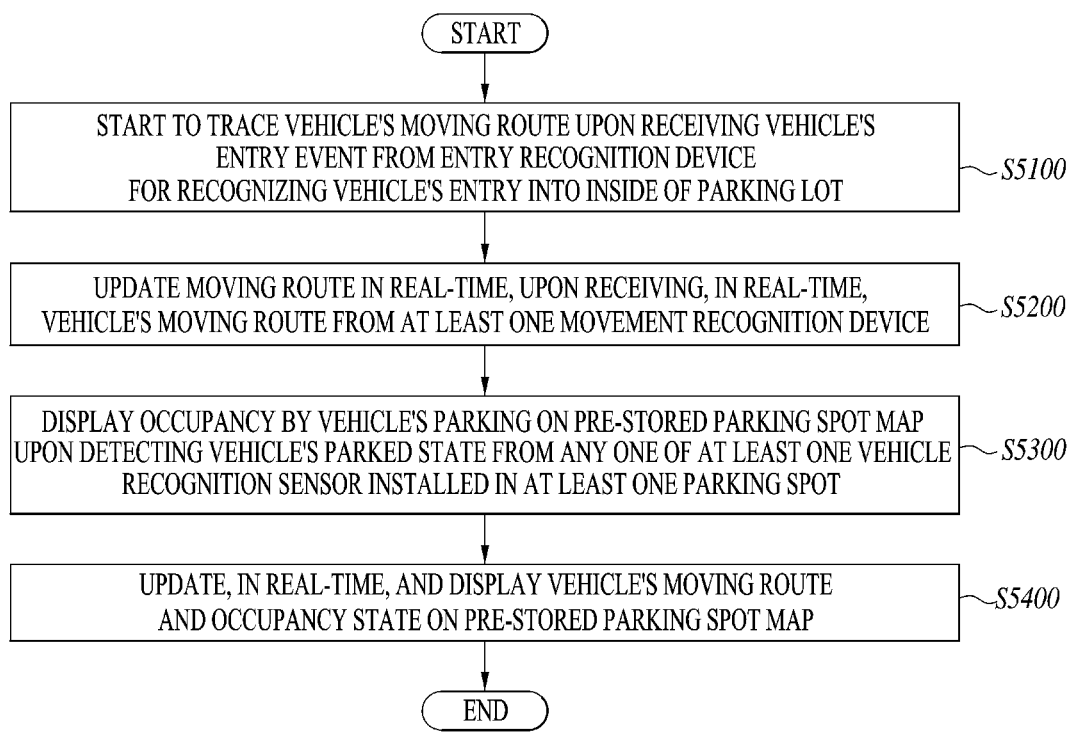
FIG. 5 is a flowchart illustrating a method for providing a smart parking space guide service to provide a real-time moving route and occupancy state according to an embodiment of the disclosure.

FIG. 5 is a flowchart illustrating a method for providing a smart parking space guide service to provide a real-time moving route and occupancy state according to an embodiment of the disclosure. An example of data transmission and reception among the components is described below with reference to FIG. 5. However, embodiments of the disclosure are not limited thereto, and it is apparent to a skilled artisan that various changes or modifications may be made thereto.

Referring to FIG. 5, upon receiving a vehicle's entry event from an entry recognition device for recognizing the vehicle's entry into the inside of a parking lot, the parking space guide service provider server starts to trace the vehicle's moving route (S5100).

Upon real-time entry of the vehicle's moving route from at least one movement recognition device, the parking space guide service provider server updates the vehicle's moving route in real-time (S5200) and, upon detecting the vehicle's parking from any one of at least one vehicle recognition sensor installed in at least one parking spot, displays occupancy by the vehicle's parking on a pre-stored parking spot map (S5300).

Lastly, the parking space guide service provider server updates, in real-time, and displays the vehicle's moving route and occupancy state on the pre-stored parking spot map (S5400).

The above-described steps S5100 to S5400 are merely an example, and embodiments of the disclosure are not limited thereto. In other words, the above-described steps S5100 to S5400 may be performed in a different order, or some of the steps may be simultaneously performed or omitted.

What is not described regarding the method of providing a smart parking space guide service to provide a real-time moving route and occupancy state in connection with FIG. 5 is the same or easily inferred from what has been described regarding the method of providing a smart parking space guide service to provide a real-time moving route and occupancy state in connection with FIGS. 1 to 4, and no detailed description thereof is thus presented.

The method of providing a smart parking space guide service to provide a real-time moving route and occupancy state according to an embodiment described with reference to FIG. 5 may be implemented in the form of a recording medium or computer-readable medium containing computer-executable instructions or commands, such as an application or program module executable on a computer. The computer-readable medium may be an available medium that is accessible by a computer. The computer-readable storage medium may include a volatile medium, a non-volatile medium, a separable medium, and/or an inseparable medium. The computer-readable medium may include a computer storage medium. The computer storage medium may include a volatile medium, a non-volatile medium, a separable medium, and/or an inseparable medium that is implemented in any method or scheme to store computer-readable commands, data architecture, program modules, or other data or information.

According to an embodiment, the above-described method of providing a smart parking space guide service to provide a real-time moving route and occupancy state may be executed by an application installed on a terminal, including a platform equipped in the terminal or a program included in the operating system of the terminal), or may be executed by an application (or program) installed by the user on a master terminal via an application provider server, such as a web server, associated with the service or method, an application, or an application store server. According to an embodiment, the above-described method of providing a smart parking space guide service to provide a real-time moving route and occupancy state may be implemented in an application or program installed as default on the terminal or installed directly by the user and may be recorded in a recording medium or storage medium readable by a terminal or computer.

Although embodiments of the present invention have been described with reference to the accompanying drawings, It will be appreciated by one of ordinary skill in the art that the present disclosure may be implemented in other various specific forms without changing the essence or technical spirit of the present disclosure. Thus, it should be noted that the above-described embodiments are provided as examples and should not be interpreted as limiting. Each of the components may be separated into two or more units or modules to perform its function(s) or operation(s), and two or more of the components may be integrated into a single unit or module to perform their functions or operations.

It should be noted that the scope of the present invention is defined by the appended claims rather than the described description of the embodiments and include all modifications or changes made to the claims or equivalents of the claims.

What is claimed is:

1. A method for providing a smart parking space guide service to provide a real-time moving route and occupancy state, the method executed by a parking space guide service provider server, the method comprising:

starting to trace a vehicle's moving route upon receiving the vehicle's entry event from an entry recognition device for recognizing entry of the vehicle into a parking lot;

updating, in real-time, the vehicle's moving route upon real-time entry of the vehicle's moving route from at least one movement recognition device;

displaying occupancy by the vehicle's parking on a pre-stored parking spot map upon sensing the vehicle's parking state from any one of at least one vehicle recognition sensor installed in at least one parking spot; and updating, in real-time, and displaying the vehicle's moving route and occupancy state on the pre-stored parking spot map;

displaying the vehicle's moving route and occupancy state on the pre-stored parking spot map, when entry of at least one user terminal is directed to an inside of the parking lot, overlaying the updated moving route and occupancy state on the parking spot map and transmitting the parking spot map to the at least one user terminal; and controlling the at least one user terminal to output the moving route and the occupancy state on a screen, wherein the service is performed in a background mode when it is recognized that the at least one user terminal is located in the parking lot, and forced access to the background by the broadcasting is gained to automatically display the occupancy state and map on the screen of the at least one user terminal although the at least one user terminal does not open the app or access the webpage.

2. The method of claim 1, wherein updating, in real-time, the vehicle's moving route upon real-time entry of the vehicle's moving route from the at least one movement recognition device includes:

extracting depth information for an object corresponding to the vehicle from an image or image data received from the at least one movement recognition device and performing three-dimensional (3D) image processing to identify a moving direction of the vehicle.

3. The method of claim 1, further comprising:

after displaying occupancy by the vehicle's parking on the pre-stored parking spot map upon sensing the vehicle's parking state from any one of at least one vehicle recognition sensor installed in at least one parking spot, upon receiving the vehicle's exit event from an exit recognition device for recognizing the vehicle's exit from the parking lot, removing the vehicle from a parking vehicle list.

4. The method of claim 1, further comprising:

after controlling the at least one user terminal to output the moving route and the occupancy state on the screen, when an unoccupied parking space is selected on the parking spot map by the at least one user terminal, changing the selected parking space into an occupied state; and providing a route to the parking space selected by the at least one user terminal.

5. The method of claim 1, further comprising:

after updating, in real-time, and displaying the vehicle's moving route and occupancy state on the pre-stored parking spot map, calculating a parking fee based on the at least one user terminal's time of entry into the parking lot and time of exit from the parking lot; and transmitting an authorization request to the at least one user terminal to allow the at least one user terminal to automatically pay for the calculated parking fee and, when an authorization event corresponding to the authorization request occurs, automatically paying for the parking fee.

6. The method of claim 1, wherein the entry recognition device is a camera or at least one sensor, wherein the movement recognition device is a device for receiving a signal generated from a camera or a user terminal, and wherein the vehicle recognition sensor is a camera or at least one sensor.

7. The method of claim 1, wherein the pre-stored parking spot map is formed of a two-dimensional (2D) image when the parking lot is a single-level parking lot, and the pre-stored parking spot map is formed of a 3D image when the parking lot is a multi-level parking lot, and wherein the parking spot map is rotated, enlarged, shrunken, moved, or selected by at least one touch gesture user interface (UI).

* * * * *